United States Patent [19]

Handa et al.

[11] Patent Number: 5,158,725
[45] Date of Patent: Oct. 27, 1992

[54] CONTINUOUS MIXING OF ELASTOMERIC COMPOUNDS

[75] Inventors: Pawan K. Handa; Colleen M. Lansinger, both of Akron; Vetkav R. Parameswaran, University Heights; Gordon R. Schorr, Uniontown, all of Ohio

[73] Assignee: The Goodyear Tire & Rubber Company, Akron, Ohio

[21] Appl. No.: 694,263

[22] Filed: Apr. 29, 1991

[51] Int. Cl.$^5$ .................. B29C 47/60; B29C 47/92
[52] U.S. Cl. .................. 264/40.7; 264/211; 264/211.23; 366/85; 366/88; 366/90; 425/145; 425/204
[58] Field of Search ............ 264/40.1, 40.3, 40.4, 264/40.6, 40.7, 68, 211, 211.23, 349; 425/140, 143, 145, 204; 366/83, 84, 85, 88, 90

[56] References Cited

U.S. PATENT DOCUMENTS

| | | |
|---|---|---|
| 3,360,689 | 12/1967 | Haury . |
| 3,453,356 | 7/1969 | Kent et al. . |
| 3,746,319 | 7/1973 | Black . |
| 3,904,719 | 9/1975 | Fritsch . |
| 4,056,591 | 11/1977 | Boettler et al. . |
| 4,102,240 | 7/1978 | Bassani . |
| 4,150,932 | 4/1979 | Moghe . |
| 4,212,543 | 7/1980 | Bersana . |
| 4,257,468 | 3/1981 | Ogawa et al. . |
| 4,267,285 | 5/1981 | Broutman . |
| 4,332,759 | 6/1982 | Ide . |
| 4,468,364 | 8/1984 | Ide . |
| 4,487,881 | 12/1984 | Rawlings et al. . |
| 4,495,324 | 1/1985 | Chacko et al. . |
| 4,550,002 | 10/1985 | Uhland et al. ............ 264/40.1 |
| 4,617,227 | 10/1986 | Weaver . |
| 4,663,103 | 5/1987 | McCullough et al. ............ 264/40.4 |
| 4,728,698 | 3/1988 | Isazer et al. . |
| 4,736,001 | 4/1988 | Carlmara . |

FOREIGN PATENT DOCUMENTS

| | | |
|---|---|---|
| 133357 | 2/1985 | European Pat. Off. . |
| 246732 | 11/1987 | European Pat. Off. . |
| 1347088 | 2/1974 | United Kingdom . |

OTHER PUBLICATIONS

Advances in Polymer Technology vol. 6, No. 3 (1986) pp. 339–386 in "Physical and Chemical Changes During the Extrusion Process" by Bartilla, et al.

*Primary Examiner*—Leo B. Tentoni
*Attorney, Agent, or Firm*—David E. Wheeler

[57] ABSTRACT

An elastomer masterbatch or a compounded productive elastomer stock is made using a twin screw extruder to mix elastomer components in multiple mixing zones at controlled temperatures. Elastomer and other ingredients are fed into the twin screw extruder continuously through precise loss-in-weight or volumetric feeders. The degradation temperature and/or cross linking temperature of the elastomer determines the rate at which the elastomer can be processed, since friction created during mixing heats the elastomer. Accordingly, the maximum rate of compounding is a function of the torque limit, cooling efficiency, and conveying capacity of the extruder. The conveying capacity and torque limit are also a function of the size of the extruder. The viscosity of the elastomer compound in the extruder, as measured by a Mooney viscosimeter (ASTM D1646), is typically in the range of about 20 to 250 units (ML(1+4)100C).

12 Claims, 4 Drawing Sheets

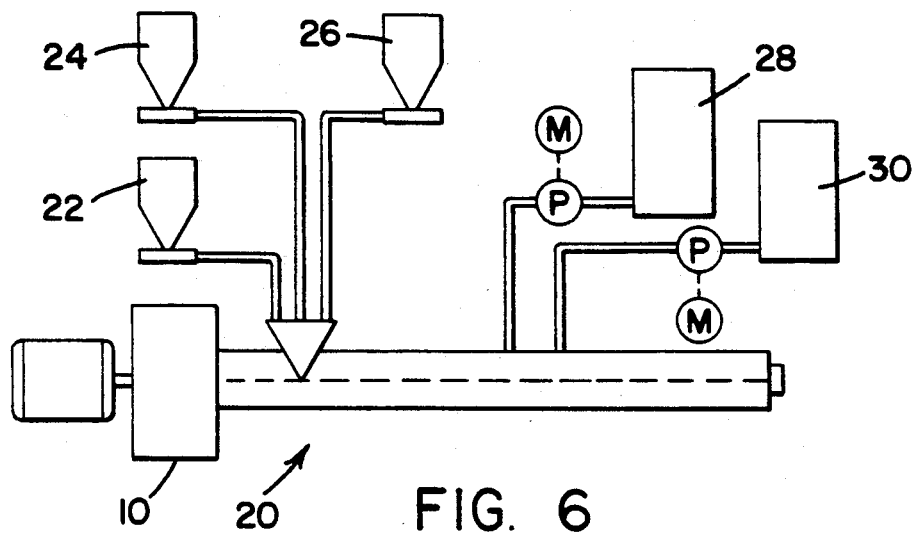
FIG. 6
FIG. 7
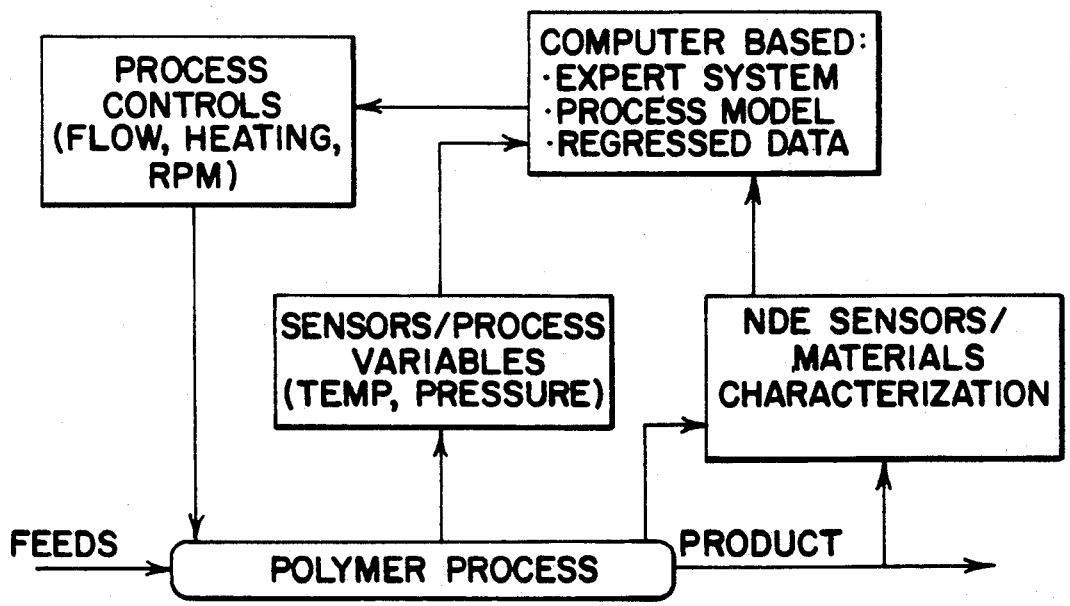

CONTINUOUS MIXING OF ELASTOMERIC COMPOUNDS

BACKGROUND OF THE INVENTION

The invention relates to a method for the continuous manufacture of elastomeric compounds. More particularly the invention relates to the continuous manufacture or mixing of rubber and rubber related compounds utilizing an extruder.

The predominant prior art method of mixing rubber is the use of internal mixers, such as the Banbury ® mixer manufactured by Farrel Corp. Internal mixers are used in batch type operations in which an elastomeric compound and other ingredients of the mixture are added at various times.

Internal mixers of the Banbury ® type, because of dusting and mixing problems, often require the addition of ingredients in small increments. This requires, in most cases, the presence of workers in the mixer area at all times. Also, because such mixers are substantially open, fumes from the mixture often permeate the atmosphere in the area of the mixer.

Because of the various problems with internal mixers, and because of the chemical nature of some mixtures, in some cases not all the ingredients of the mixture can be mixed together at one time. As a result, an elastomer may be mixed with some of the ingredients, and then discharged or dumped and held in inventory as an intermediate product. The intermediate product can be further processed when needed, and additional ingredients may be added and mixed therein.

Each mixing step in the internal mixer is known in the art as a "pass".

While some mixtures require only a single pass, others may require as many as four or five passes through conventional mixers. This is time consuming and labor and capital intensive. Furthermore, when using conventional batch mixing devices, the operator must observe stringent quality control procedures that help maintain uniformity from one batch to another.

Accordingly, the industry has attempted to develop a process by which rubber can be produced in a single pass or in a continuous process. One such attempt is a machine which is essentially an internal mixer having a screw conveyor or an extruder located below the rotors of the mixer. See, for example, GB 2 173 441; GB 2 191 713; and GB 1 550 364.

For a discussion of the slow adoption of continuous compounding in the rubber industry, see "A Tale of Continuous Development", European Rubber Journal, by Harry Ellwood, March 1987.

Twin screw extruders are commonly used in the plastics industry to prepare plastic compositions, in particular thermoplastic compositions. Plastics tend to become less viscous at higher temperatures (prior art methods usually include heating the plastic in the extruder to bring the plastic to its melt temperature), and the wetting action of plastics at processing temperatures improves the processability of the plastic in a twin screw extruder.

Elastomers typically do not show a sharp melting point and, at normal processing temperatures, are very viscous, and may tend to either cure or degrade during mixing because of the heat caused by the friction of mixing. If mixed in a twin screw extruder in the same manner as plastics, the elastomer resistance and friction would tend to damage the compound and may even result in damage to the extruder.

It is an object of the present invention to provide a method for mixing rubber in a continuous process and to provide a method for mixing rubber wherein improved dispersion of the added ingredients is obtained.

Other objects of the invention will be apparent from the following description and claims.

SUMMARY OF THE INVENTION

This invention relates to a method which provides for the mixing of elastomeric compounds in mixing devices having elongated twin screws, such as twin screw extruders. More specifically, the present invention relates to a method for the continuous mixing of elastomers comprising the steps of: a) providing a twin screw extruder comprising a barrel housing containing the twin screws, the barrel housing having associated therewith feed openings, and discharge and/or vent openings: b) determining desired feed rates based on the viscosity of the elastomer compound, the size of the extruder, the torque limit, the temperature limit and speed of operation of the extruder; c) feeding an elastomer continuously in a controlled manner into the extruder through a feed opening: d) feeding at least one filler, additive, oil, another elastomer, pigments, or curative in a controlled manner into the extruder through a feed opening or openings: e) mixing ingredients of step (d) with the elastomer as they are added to provide a mixture: f) controlling the temperature and the pressure of the mixture along the length of the screws: g) maintaining the viscosity as measured on a Mooney viscosimeter of said mixture between 20 and 250 units: and h) discharging the mixture from the discharge opening of the extruder.

By creating mixing zones in the screw profile, mixing can be varied in such zones depending on the requirement of the ingredients being mixed.

A co-rotating or counter-rotating twin screw extruder can be used in the method, and the method may further comprise the steps of using precise volumetric or loss-in-weight feeders to meter the elastomer and other ingredients into the extruder.

Computerized controls and strategically placed sensors, which are networked with the computer system, can be used to provide a completely automated, continuous processing system.

It is believed that the method of the invention can be used with any known elastomer. Processing of diene elastomers using the method of the invention is particularly advantageous.

The extruder used in the method preferably has a screw profile with an L/D ratio of about 5 to 70. The elements in the extruder may be arranged to form a plurality of mixing zones, and/or high pressure zones, along the screw profile.

In a preferred embodiment where a co-rotating twin screw extruder is used, the extruder may comprise 20% to 80% kneaders, mixers, and blisters.

BRIEF DESCRIPTION OF THE DRAWINGS

FIG. 6 illustrates a schematic view of an apparatus used for continuous processing of rubber.

FIG. 7 illustrates a schematic view of a mixing system that uses computer control.

DETAILED DESCRIPTION OF THE INVENTION

Figure 1:
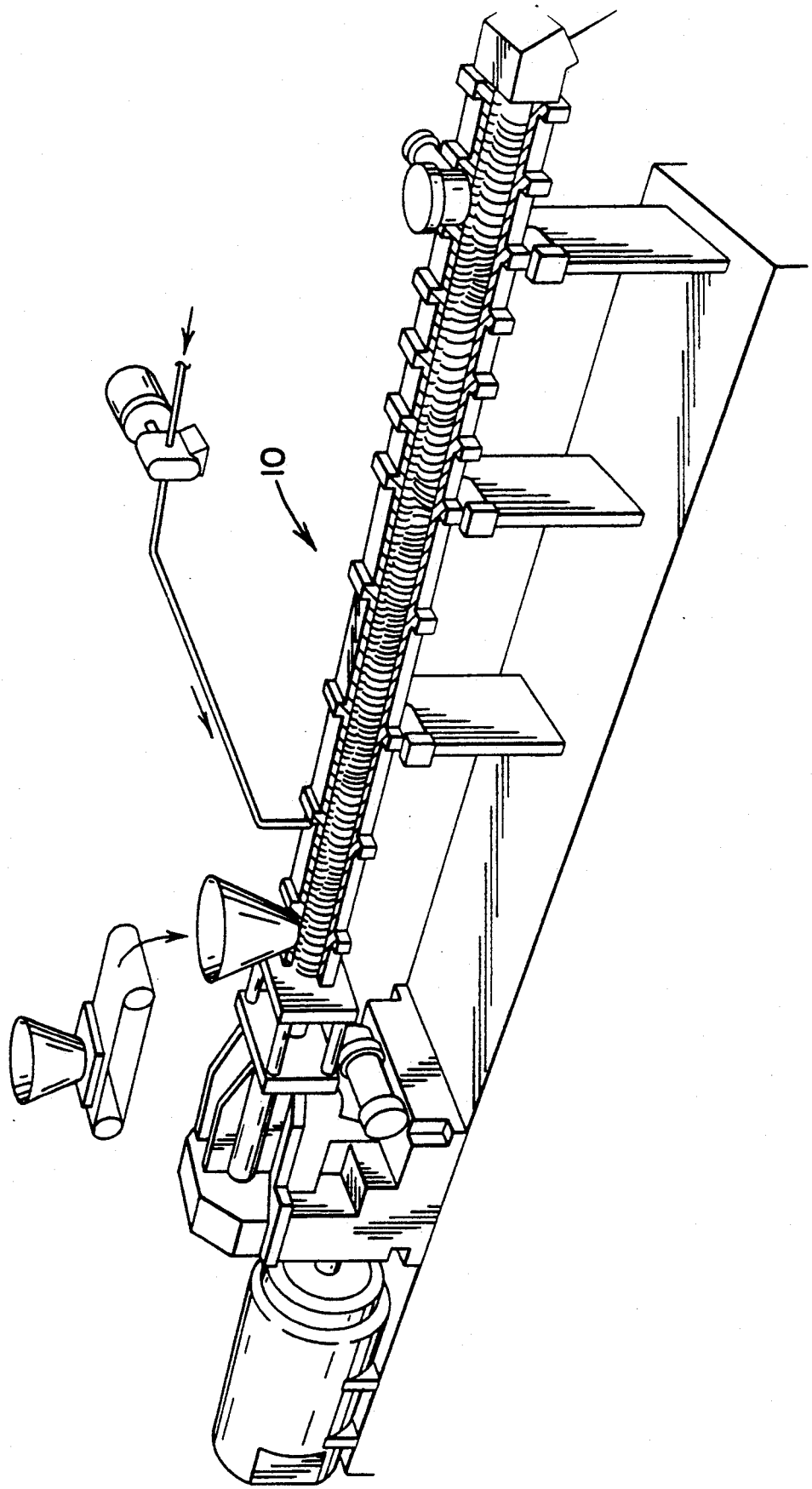
FIG. 1 illustrates a prior art twin screw extruder.

With reference now to FIG. 1, a prior art twin screw extruder which is normally used for mixing thermoplastic compositions is illustrated.

When a 40 mm. extruder, for example, is used for preparing thermoplastic compositions, the extruder is operated hot (150° to 500° C.) at about 400 RPM and provides about 300 to 400 pounds of extrudate per hour.

In the method of compounding an elastomer of the invention, a high shear twin screw extruder of co-rotating or counter-rotating design can be used. Because an elastomer tends to cure or degrade during mixing, the extruder must be operated at a lower temperature than when it is used for plastics. In the method of the invention, the extruder is operated such that most of the heat input is generated by viscous dissipation of the mechanical work of the mixing (friction). External heating or cooling may be applied to control the temperature. Since elastomers are not melted in the extruder, high friction and low flowability are encountered.

The specific rate of mixing of a particular elastomeric compound can be determined, in part, based on the viscosity of the elastomer since viscosity determines the level of friction encountered in the mixing, and therefore the temperature achieved at a particular mixing rate. The mixing rate is also limited by the torque limit of the screws (torque limit being defined as the torque at which the screws break or yield during mixing) and conveying capacity along the extruder length (this rate, in part, is dependant on the number and nature of transport elements) of the extruder.

Using a proper screw profile, it has been found that twin screw extruder 10 can be used to provide intimate mixing of elastomeric compounds when operated at about 30–400 RPM to provide 30 to 150 lbs of extrudate per hour when the extruder is a 40 mm extruder.

Elastomers and other ingredients may be metered into the extruder using precise volumetric or loss-in-weight feeders which are well known in the plastics art. Screw profiles have been established which give a correct balance of transport, distributive mixing and dispersive mixing for specific compounds, while controlling the temperature of the stock. Temperatures, feed rates and screw speeds are precisely controlled during a mixing run.

Feed rates and the location of the feed may be varied depending on the requirements of the particular compound being mixed.

The temperature, as well as the pressure in the extruder may be controlled by the selection of screw profile elements, and their orientation relative to one another. Multiple zones of high pressure (high pressure zones) may be established in the extruder by restricting the flow of material in certain areas of the extrusion barrel by using helical elements having more turns per inch (shorter pitch) than the helical elements used as feeders, and/or by using a variety of back mixing elements such as helical screws with reversed flights, or by using flow restrictors, or by arranging bladed mixing elements to restrict the flow of material through the barrel, or a combination of both.

In an alternative embodiment, the twin screw extruder may have one single mixing zone.

Because of screw interaction, counter-rotating twin screw extruders most often have screw profiles that contain only helical screws and throttling arrangements.

It is preferred that screw profiles used in the method of the invention have an L/D ratio of 5 to 70, preferably 10 to 50 and more preferably 15 to 40. Such screw profiles yield the desired level of dispersion without seriously degrading the polymer. Typical components of the twin-screw extruder may comprise high-shear mixing elements such as kneaders: elements that enable redistribution of the materials such as toothed elements, gears or pins: axial mixing elements such as helical screws with optionally chosen pitch and flight width: flow restrictors such as blisters, adjustable or fixed throttling arrangements, or screw flights with smaller flight depth; and elements that mainly promote axial movement of the material such as helical screws. These elements may be arranged on two or more shafts that rotate about their axes in the same sense (co-rotational) or in the opposite sense (counter rotational) with respect to each other. The screw shafts may be parallel, convergent, or divergent. The rotational speeds of those shafts may or may not be the same. The screw shafts may be placed apart at various distances with respect to each other so as to enable the assembly of elements on each shaft to intermesh to various extents or not intermesh at all. The materials may be fed to the extruder at one or more locations along the length of the barrel.

Each of the helical screw elements, and blocks of kneaders and gear mixers, may be either right or left handed. The choice of orientation of each of the elements (including whether the element will be left handed or right handed) is made based on the degree of back mixing and/or pressure gradient and temperature/shear history required along the extruder length. The final properties of a compound are somewhat dependant on the shear it is subjected to in the mixing (i.e. shear history).

Some variations in the design of dispersive kneaders include single cam, double or multi lobe designs. The helical screw elements may have single, double or multiple flights. The number of teeth on the gear or toothed mixer may also vary. In the embodiments shown in the examples, gear wheels with ten teeth were used. The cams on the kneaders and the teeth on the gears may be staggered from one unit to the next at various angles from 0° to 90°, advancing in the right handed sense or in the left handed sense. The stagger angles used in the examples include 45° and 22.5°, right and left handed.

Another method of providing restricted flow in a twin screw extruder is to use a back pumping element. Back pumping in an extruder is produced when an element is used which generates a local pressure gradient opposing the global pressure gradient of the extruder. For example, if the majority of elements have a left hand helix (counterclockwise) and a back flow element has a right hand helix (clockwise), material in the extruder must build sufficient pressure against the back flow element to "leak" around the back flow element. As is apparent, the alignment of screw elements relative to one another and their size relative to the extruder barrel control how the material "leaks" around high pressure zones.

Figure 2:
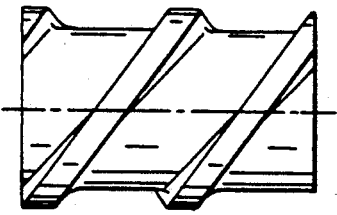
FIG. 2 illustrates a prior art transport element for a twin screw extruder.
Figure 3:
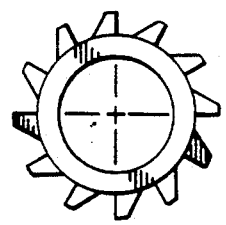
FIG. 3 illustrates a distributive mixing gear.
Figure 3A:
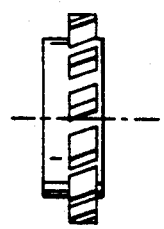
FIG. 3a illustrates a side view of a distributive mixing gear.
Figure 4:
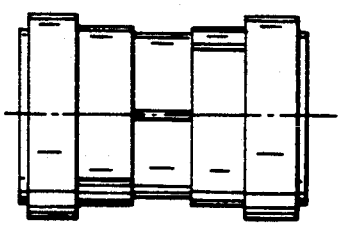
FIG. 4 illustrates a high shear dispersive mixing kneader.
Figure 5:
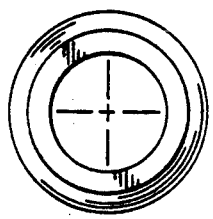
FIG. 5 illustrates a blister element (flow restrictor) for a twin screw extruder.
Figure 5A:
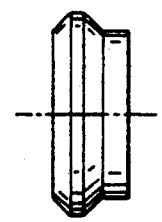
FIG. 5a illustrates a side view of a blister.

In the embodiment where a co-rotating twin screw extruder is used, screw profiles are established using screw elements that are known in the art in the plastics industry. A typical screw profile comprises a number of helical screws (FIG. 2) which are used primarily to transport the composition components through the extruder barrel, distributive mixing gears (FIGS. 3 and 3a) which provide low shear rearrangement of the components, and dispersive mixing elements (kneaders) (FIG. 4) which provide high shear micro dispersion of components. An element known as a blister (FIGS. 5 and 5a) optionally may be used to reduce the barrel cross sectional area at specific locations in order to increase the local residence time and work input.

In the illustrated embodiment, the screw profile may be construed as being composed of a plurality of mixing zones, where a mixing zone may be defined as a continuous segment of the extruder having similar screw elements.

With reference now to FIG. 6, the apparatus 20 of the invention may comprise a twin screw extruder 10 which is connected to a plurality of loss in weight feeders 22,24,26 and/or liquid feeders 28,30. Various feeders may be connected to separate mixing zones of the twin screw extruder, and more than one feeder may feed into the same mixing zone, depending on the mixing requirements.

Those skilled in the art will recognize that other types of feeders and feeding arrangements can be used.

It was desirable for preliminary evaluation of the method to set up mixing zones in the twin screw extruder to correspond substantially to each pass required to prepare the compound in a Banbury ® mixer, since Banbury ® mixer compounding of elastomers has been well characterized. Those skilled in the art will recognize, however, that because of the unique interaction of the screws of the twin screw extruder, the number of mixing zones required to prepare an elastomer compound in a twin screw extruder need not correspond to the number of passes required to prepare the same compound in a Banbury ® mixer.

FIG. 7 illustrates a schematic of a computer control system which can be used with the method. Nondestructive Evaluation (NDE) sensors may be utilized to characterize the evolution of microstructure of the polymer in real time. These data, and data obtained from conventional process variable sensors, can be transmitted to a computerized decision-making system that comprises expert systems that make instantaneous choices regarding which control parameters to manipulate and process models that quantify actions taken. Where complete models are unavailable, regressed, empirical data can be used, or the expert system can use previously developed heuristics to manipulate the control system. The NDE sensors and control strategy are all interrelated.

Polymer(s), oil(s) and filler(s) (typically carbon blacks) may be compounded to form a masterbatch, or they may have pigments and stabilization packages included to produce non-productive stocks. Cure packages can be incorporated with non-productive materials in the same step or in a subsequent step to produce productive stocks under conditions of lower work and temperature (and mixing severity) than those utilized for non-productive stocks, as required to minimize precure.

The ingredients added to the mixture may themselves be premixed, or they can be added sequentially (at different places downstream), or simultaneously through the same feed inlet.

After leaving the extruder, the compounded rubber may be extruded through a die, e.g. a tread die, calendered into sheets, strips or strands, and may be pelletized. The various additional apparatus needed in a continuous process, including additional twin screw extruders, may be closely associated to provide a cascading continuous process.

In a preferred embodiment, a twin screw co-rotational extruder with parallel shafts that rotate at identical speeds is used. The center lines of the two shafts are so located as to provide full intermeshing of the elements on the two shafts. For this preferred embodiment, the elements may be chosen such that 10% to 80% provide high shear mixing, 10% to 80% provide redistribution, and 10% to 80% promote axial transportation. Flow restrictors may be placed at 0 to 25 locations. The proportions of each type of element has been determined as a percentage of the total length of the extruder. The percentages may also be expressed for example as a number of individual pieces etc. The elements may further be arranged on the screw shaft or interspersed in a manner that would yield an ideal combination of transport, mixing, redistribution, axial mixing, and throttling.

It has been found when using a co-rotating, twin screw extruder for mixing elastomers, that suitable dispersion can be obtained when a screw profile contains 20% to 80%, preferably 20% to 50% kneaders, gear mixers, and axial mixers. The remainder of the screw profile optionally comprises spacers and helical screws for transporting the composition along the barrel of the extruder and elements to restrict flow at specific locations.

The extruder temperature may be controlled by a set of electrical heating elements or by circulating heating and/or cooling fluid through the shafts and/or through cores provided on the barrel itself or in additional contact surfaces.

In the illustrated embodiment, a fully intermeshed twin screw extruder is used. By fully intermeshed it is meant that both screw profiles in the extruder have a complementary set of elements and that there is intermeshing of the elements.

From the data obtained, it has been found that particular properties of a compound produced in a twin screw extruder can be optimized by choosing the feed opening used for each ingredient in the compound and by controlling the speed and temperature at which the compound is mixed.

Figure 8:
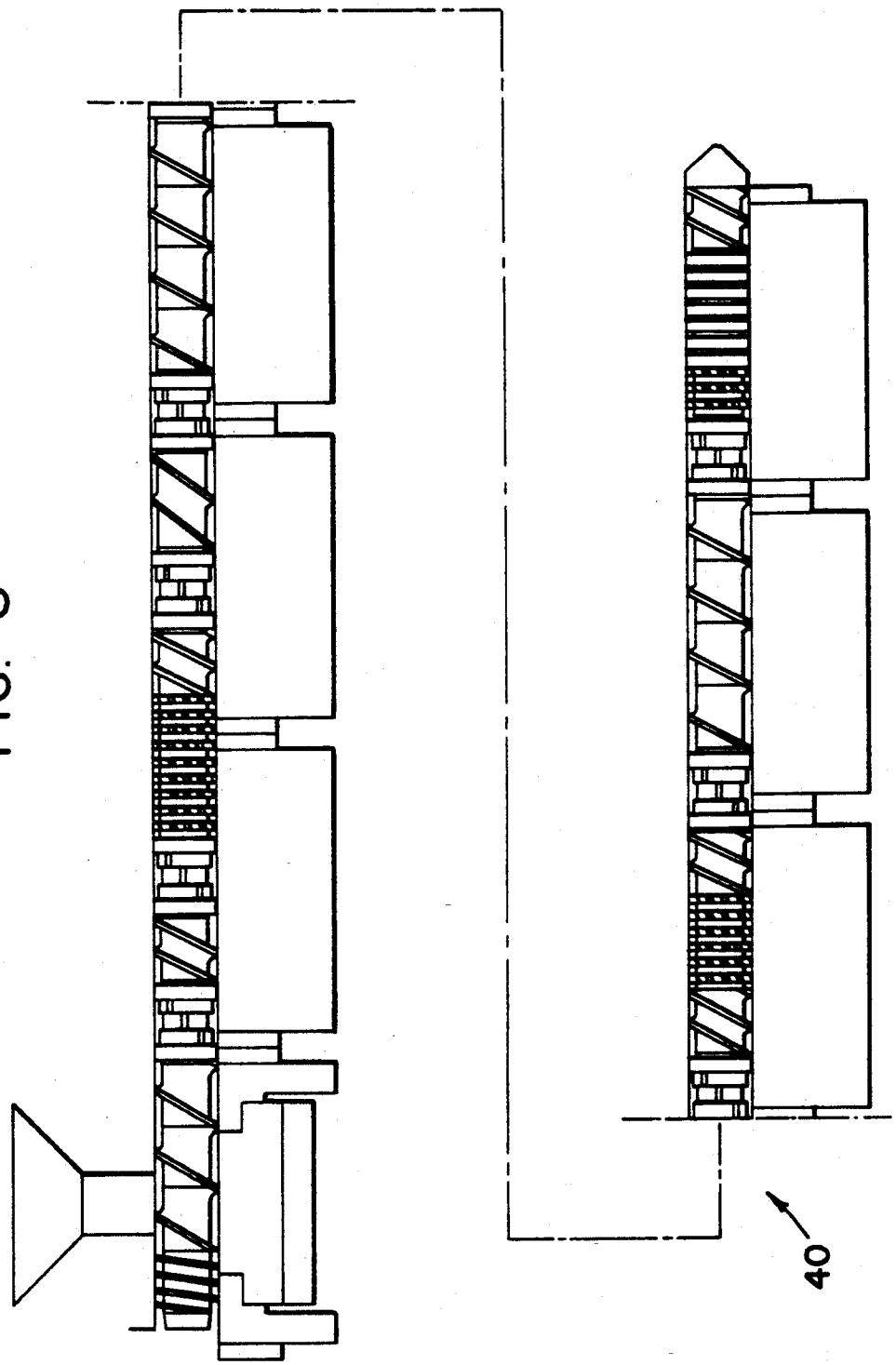
FIG. 8 illustrates a customized screw profile for a twin screw extruder.

With reference now to FIG. 8, a specific embodiment of a screw profile useful in the method of the invention is illustrated. Screw profile 40 is for a 40 mm diameter screw barrel extruder 1380 mm in length. For convenience, as used herein, screw extruder elements will be illustrated with the following designations:

D represents a drive end spacer.
H represents a helical screw element.
B represents a blister.
E represents a helical element that prevents backup of material at the feed end.
S represents a spacer.

K represents a high shear dispersive mixing (kneading) element.

G represents a toothed distributive mixing element.

Numbers preceding these designations indicate that there is that number of such elements in sequence. The number following these designations indicates the length of each piece in millimeters.

L represents left-handed (counterclockwise) advancement while R represents right handed (clockwise) advancement.

Double refers to double flights.

Those skilled in the art will recognize that the arrangement of the screw elements are important to the practice of the invention and that suitable screw profiles can be used which do not employ spacers.

Referring now to FIG. 6, the elastomer(s) and other ingredients may be added or metered into the extruder 10 at various locations along its length in a manner that provides adequate downstream mixing and at the same time reduces the degradation of the elastomer or other components. The product may be discharged from the extruder either directly or through a die arrangement. In the event that a die arrangement is used, its geometry as well as the size of the narrowest part of the construction must be controlled to regulate the head pressure, extrudate shape and extrudate temperature. In a preferred embodiment, the product may be expelled through one or more die openings having an area corresponding to 2%-80% and preferably 10%-50% of the nominal barrel cross sectional area. The nominal barrel cross sectional area in the illustrated 40 mm extruder is 2513 sq mm. The die openings may be of any shape desired, dependent on the use contemplated for the extrudate.

It has been found that in some applications, good results are obtained when a less restrictive die or no die is used. Using a less restrictive die apparently improves the efficiency of the extruder for some compositions since back pressure is reduced at the end of the machine, and the composition apparently moves more easily through the machine.

In the method of the invention, the elastomer, for example SBR, is added to the feed hopper 22. The rate of addition is carefully controlled by loss-in-weight feeders. The temperatures in the barrels is maintained at about 60°-500° F., preferably 60°-400° F. If desired the rate of heating may be controlled by the use of electrical heating elements. Cooling is achieved by circulating water. The product is collected at the discharge end either directly or by extrusion through a die when a continuous extrudate is needed. Stabilizers and antioxidants such as trimethylquinolines, phenylenediamines, and phenothiazines and fillers such as silicon dioxide, carbon black, and zinc oxide, and other chemicals such as sulfur, stearic acid and other carboxylic acids, tetramethylthiuram disulfide, and/or mercaptobenzothiazole disulfide may be fed into the appropriate feed hopper. The viscosity may be adjusted by the injection of oils and waxes (typically petroleum based) into the extruder.

It is believed that the method of the invention can be used with any known elastomer. Processing of diene elastomers using the method of the invention is particularly advantageous.

Examples of elastomer compounds that may be mixed in the method include natural rubber, polyisoprene, butyl and halobutyl rubber, polychloroprene, EPDM, styrene butadiene and polybutadiene rubbers, similar rubbers known in the art, and mixtures and chemical modifications thereof.

It has been found using the method of the present invention that elastomers can be mixed using one continuous mixing process, and that substantially better dispersion is achieved than that obtained by multi-step mixing used in the prior art. It is believed that better dispersion provides a more uniform product. The method, while achieving substantially better results is less expensive than the multi-step batchwise processes currently used in the art, requires less manpower and less material handling. Production stocks can be prepared without the necessity of preparing intermediate products which must be stored and inventoried. Workers' exposure to dust and fumes is also reduced as compared to conventional internal mixers. Also, preliminary results suggest that elastomer compounds made according to the invention have better dispersion and achieve a better cure as compared to the same formulations prepared by conventional internal batch mixing processes.

The invention is further illustrated with reference to the following examples.

EXAMPLE 1

This example illustrates a particular screw profile arrangement in a twin screw extruder and the use of the extruder for mixing an elastomer composition.

A 40 mm twin-screw extruder with a nominal length to diameter ratio of 33 was used. The total length of the screw shaft was 1380 mm. The extruder was driven by an alternating current variable speed motor rated for 30 kilowatts. A V-belt drive arrangement was used to convey power from the motor to the gear box drive. The two output shafts from the gear box were coupled to the extruder.

The extruder was of the co-rotational, fully intermeshing, self-wiping type. The extruder temperature was controlled by electrical heating elements and a cooling water circulation system. The temperature of the cooling water was maintained at a constant level using a temperature control unit. The screw elements were assembled as illustrated below.

Configuration of Screw Elements—L

1 D10
1 E40
5 H40
1 S1.75
1 K50 L-22.5
1 S1.75
1 H40 double
1 S1.75
1 K50 L-22.5
3 G30
1 H40 double
1 S1.75
1 K50-L45
1 S1.75
1 H60 double
1 S1.75
1 K 50-L45
1 S1.75
4 H 40
1 S1.75
1 K 50 L45
1 S1.75
1 H 40 double 2 G30
1 H40 double
1 S1.75
1 K50 L45
1 S1.75
4 H40
1 S1.75
1 K50 L22.5
1 S1.75
1 G30
7 (K9+S1.75) L22.5
1 S1.75
1 H40 double A granulated mixture of natural rubber and SBR (styrene butadiene rubber) was added into a feed hopper of the extruder together with carbon black and zinc oxide. Oils, waxes and antioxidants were injected continuously into barrel segment 1 during mixing. The rubber mixture was added through the feed hopper at a rate of 20 lb/hr and carbon black and zinc oxide were added at a rate of 9.3 lb/hr. The oils and waxes were added at a combined rate of 2.77 lb/hr.

The extruder was run at 70 rpm (total input 32 lb/hr) and the power consumption was 3.8 Kw.

The extrudate temperature was about 320° F.

The extrudate product was compared with a control compound mixed in a Banbury type batch mixer. The extrudate and the control sample were further mixed with silica, curatives and accelerators under identical conditions. The cured samples had the following properties.

| Property | Control | Extrudate 1 |
|---|---|---|
| Mooney Viscosity | 107 | 109 |
| Rebound (%) | 41 | 45.7 |
| Shore A Hardness | 66.1 | 64.1 |
| Elongation (ultimate) % | 486 | 504 |
| 300% Modulus (MPa) | 11.3 | 10.98 |

This data illustrates the feasibility of using the twin-screw extruder to produce a compound with properties similar to those obtained by conventional Banbury ® type mixing.

EXAMPLE 2

Example 1 was repeated with the downstream addition of silica in barrel segment 3 at the rate of 4.1 lb/hr. The extruder speed was maintained at 70 rpm. The power consumption was 4.7 Kw and the extrudate had a temperature of 350° F. The extrudate was mixed with curatives and compared with a control in the manner described in example 1.

| Property | Control | Extrudate 2 |
|---|---|---|
| Mooney Viscosity | 107 | 107 |
| Rebound % | 41 | 41.8 |
| Shore A Hardness | 66.1 | 69.2 |
| Elongation (ultimate) | 486 | 444 |
| 300% modulus | 11.38 | 13.1 |

This data illustrates that the properties of the compound can be controlled by process modification dependant on the distributive and dispersive mixing as can be seen by the reduced elongation and increased modulus.

EXAMPLE 3

Example 2 was repeated except that the silica was added to the feed hopper instead of segment 3 and the screw elements were arranged as illustrated below.

Screw Configuration—M

1 D10
1 E40
5 H40
1 S1.75
1 K50L22.5
1 S1.75
2 G 30
1 H30 double
1 S1.75
1 K50L22.5
1 S1.75
2 H 40
1 G 30
1 S1.75
1 K50L22.5
1 S1.75
1 H40
1 S1.75
2 G30
1 S1.75
1 H 60 double
1 S1.75
1 K50 L45
1 S1.75
1 H 60 double
1 S1.75
4 H40
2 G30
1 S1.75
1 K50 L45
2 G 10
2 H40 double The curatives and accelerators were added into downstream barrel segment 3. The extruder speed was 65 rpm, the power consumption was 4.1 Kw and the extrudate temperature was 225° F. The extrudate (3) was compared to a control prepared as described in Example 1.

| Property | Control | Extrudate 3 |
|---|---|---|
| Mooney Viscosity | 107 | 98 |
| Rebound | 41 | 43.5 |
| Hardness | 66.1 | 66.4 |
| Elongation (ultimate) | 486 | 515 |
| 300% Modulus | 11.36 | 10.5 |

The data illustrates the feasibility of mixing a productive compound containing curatives in one single pass through the extruder.

EXAMPLE 4

This example illustrates the use of a twin screw extruder for preparing masterbatch formulations. The 40 mm extruder was set up as described in example 1 (configuration L). A mixture of an oil extended emulsion SBR and PBD (polybutadiene) rubber in the ratio of 3.2:1 was added to the feed hopper at a rate of 10.72 lb/hr. Carbon black was added to the feed hopper at the rate of 6.37 lb/hr. A highly aromatic oil was fed along with waxes and antioxidants into the extruder at barrel segment 1 at a rate of −2.91 lb/hr. The extruder was operated at 70 rpm with total input of 20 lb/hr. The power consumption was 2.5 Kw. An extrudate at 360° F. was produced.

The extrudate was mixed with curatives and accelerators in a conventional Banbury® mixer (as in Example 1). A similar masterbatch composition was prepared using a Banbury batch mixer as a control.

| Property | Extrudate 4 | Control |
|---|---|---|
| Mooney Viscosity | 64.7 | 68 |
| Rebound | 26.1 | 23.8 |
| Hardness | 61.5 | 61.9 |

EXAMPLE 5

This example illustrates an alternative method for the continuous mixing of a productive elastomeric compound using the twin screw extruder. The 40 mm twin screw extruder was set up with the following screw configuration P.

1 D10
1 E40
5 H40
1 S1.75
1 K50 L22.5
1 S1.75
1 G30
2 H40
1 H30
1 G30
1 S1.75
1 K50 L22.5
1 S1.75
1 H 40 double
1 G 30
3 H 40
1 S1.75
1 H 30 double
1 S1.75
1 K50 L45
1 S1.75
1 H60 double
1 G30
1 H60 double
1 G30
5 H40
1 S1.75
1 K50 L45
1 S1.75
1 H60 double
1 G30
1 G10
1 S1.75
1 H60
2.S1.75
1 H40

The extruder was operated at 65 rpm and a total feed rate of 35 lb/hr. The power consumption was 3.2 Kw. A granulated oil extended SBR was fed into the feed hopper at the rate of 12.7 lb/hr. A mixture of carbon black and zinc oxide was also added to the feed hopper at the rate of 10.1 lb/hr. A blend of sulfur, accelerators, and carbon black was added to the feed hopper at 1.6 lb/hr. Oils and waxes were pumped into barrel segment 1 of the extruder at a rate of 10.6 lb/hr.

Such a mixture of materials cannot be obtained commercially using conventional Banbury® type mixers because the product is so sticky that it cannot be dropped from the mixer after processing. Accordingly, it can be seen that the method of the invention can be used to produce new formulations that cannot be produced in conventional mixers.

EXAMPLE 6

This example illustrates a scale-up of the twin screw extruder mixing process. The composition of Example 5 was prepared in a 57 mm extruder using screw configuration AP-2.

CONFIGURATION AP-2

3 H80 double
1 K60R
1 H80
1 G45
2 H80
1 G45
1 K60R
2 H80
1 G45
2 H80
1 K60R
1 H60
1 G45
1 H80
2 H80
1 G45
3 H60
2 H30

The physical dimensions of the extruder are given on Table X. The extruder yielded a total rate of 140 lb/hr when operated at 175 rpm. The power consumption was 9.7 Kw.

Table XI compares data from the 40 mm extruder with data from the 57 mm extruder. The 57 mm extruder shows advantages in energy consumption showing an energy expenditure of 0.069 Kw hr/lb as compared to 0.096 Kw hr/lb consumed by the 40 mm extruder.

TABLE X

PHYSICAL DIMENSIONS OF EXTRUDERS

| Nominal Size | 40 | 57 |
|---|---|---|
| Screw diameter | 43 mm | 57 mm |
| L/D Ratio | 33 | 30 |
| Channel Depth | 6 mm | 9.5 mm |
| Minimum Die Opening | 2 × 12 mm dia | 12 × 100 mm |
| Die C/S area | 226 sq mm | 1,200 sq mm |
| Cooling | External jacket | Cored barrel |

TABLE XI

SCALED UP PRODUCTION

| Extruder Size | 40 | 57 |
|---|---|---|
| Compound | EX5 | EX6 |
| Profile | P | AP-2 |
| Mooney Viscosity | | |
| ML(1 + 4)100° C. | 32 | 28 |
| Rate (lb/h) | 35 | 140 |
| Speed (RPM) | 65 | 175 |
| Shear Rate (/S) | 24 | 55 |
| T-Extrudate (F) | 234 | 235 |
| Power (KW) | 3.3 | 9.7 |
| Sp Energy (kwh/lb) | 0.094 | 0.069 |

EXAMPLE 7

This example illustrates the improved uniformity obtained when compounds are mixed using a continuous twin screw extruder. Typical formulations mixed using the twin screw extruder were compared with those obtained in conventional mixers. Rheometer data and standard deviations were obtained.

| | PRODUCT UNIFORMITY | |
|---|---|---|
| Method of Mixing | Number of Samples | Standard Deviation in the cure property maximum torque |
| 40 mm Twin-Screw | 5 | 0.77 |
| Banbury ® Mixer | 89 | 1.79 |

This shows that the twin-screw extruder yields a more uniform product than the conventional Banbury type mixer.

While specific embodiments of the invention have been illustrated and described, those skilled in the art will recognize that the invention may be variously modified and practiced without departing from the spirit thereof. The invention is limited only by the following claims.

What is claimed is:

1. A method for the continuous mixing of elastomer compounds comprising the steps of:
   a) providing a twin screw extruder comprising a housing containing feed openings and a discharge opening,
   b) feeding an elastomer continuously in a controlled manner into the extruder through a feed opening,
   c) feeding at least one filler, additive oil, and/or another elastomer in a controlled manner into said extruder through a feed opening or openings,
   d) mixing the ingredients of step (c) using said screws with said elastomer as they are added to the housing to provide a mixture,
   e) maintaining said mixture at a Mooney viscosity ASTM-D 1646 (ML(1+4) 100C) between 20 to 250 units during mixing, and
   f) discharging the mixture from the discharge opening of the extruder.

2. The method of claim 1 wherein the mixing of the mixture comprises the further step of varying the shear mixing along the length of the screw.

3. The method of claim 2 comprising the further step of mixing the mixture using both low and high shear levels.

4. The method of claim 1 comprising the further step of building the screws by providing elements to provide for the transport of the ingredients of steps (b), (c), and the mixture.

providing distributive mixing gear elements to provide low shear rearrangements of the ingredients of (b) and (c);

providing dispersive elements to provide high shear breakdown of the ingredients of steps (b) and (c) and providing elements to build and reduce temperature and pressure of the mixture.

5. The method of claim 1 wherein said twin screw extruder is provided with co-rotating or counter rotating twin screws.

6. The method of claim 5 wherein said twin screw extruder is provided with co-rotating, intermeshing parallel screws.

7. The method of claim 1 which comprises the further step of providing computer controls for regulating feed rates of ingredients into said twin screw extruder, the rate of rotation of said screws, and the temperature and pressure of the mixture.

8. The method of claim 7 which comprises the further step of providing nondestructive evaluation (NDE) sensors in said housing to monitor said mixture and tying said NDE sensors to said computer control such that said computer control can provide an instantaneous response to a change in the condition of said mixture.

9. The method of claim 1 which comprises the further step of providing parallel screws to have a L/D ratio of 5 to 50.

10. The method of claim 1 which comprises the further steps of providing parallel screws in said twin screw extruder and building parallel screws to have
    10–80% high shear mixing elements,
    10–80% distribute mixing elements, and
    10–80% axial transporting elements.

11. The method of claim 1 which comprises the further step of building parallel screws to have a total of 35–50% kneaders, mixing gears and helical screws.

12. A method for controlling the properties of an elastomeric compound by controlling the parameter of mixing in a twin screw extruder comprising the steps of
    (a) providing a twin screw extruder comprising a housing containing a pair of screws, the housing containing feed openings and a discharge opening,
    b) feeding an elastomer continuously in a controlled manner into the extruder through a feed opening,
    c) feeding at least one filler, additive oil, and/or another elastomer in a controlled manner into said extruder through a feed opening or openings,
    d) mixing the ingredients of step d) using said screws with said elastomer as they are added to the housing to provide a mixture.
    e) controlling the pressure of said mixture along the length of said screws,
    f) optimizing particular properties of the compound produced by choosing the feed opening used for each ingredient and the screw profile used for mixing the compound and by controlling the speed and temperature at which the compound is mixed,
    g) maintaining said mixture at a Mooney viscosity ASTM-D-1646 (ML 1+4) (100C) 20 to 250 units during mixing, and
    h) discharging the mixture from the discharge opening of the extruder.

* * * * *